US006974150B2

(12) United States Patent
Jane Santamaria

(10) Patent No.: US 6,974,150 B2
(45) Date of Patent: Dec. 13, 2005

(54) FOLDABLE PUSHCHAIR FOR BABIES

(75) Inventor: Manuel Jane Santamaria, Palau de Plegamans (ES)

(73) Assignee: Jane, S.A., Palau de Plegamans (ES)

( * ) Notice: Subject to any disclaimer, the term of this patent is extended or adjusted under 35 U.S.C. 154(b) by 91 days.

(21) Appl. No.: 10/626,928

(22) Filed: Jul. 25, 2003

(65) Prior Publication Data

US 2004/0090043 A1 May 13, 2004

(30) Foreign Application Priority Data

Sep. 10, 2002 (ES) .............................. 200202189

(51) Int. Cl.⁷ ............................................. B62B 7/00
(52) U.S. Cl. ................................. 280/647; 280/47.4
(58) Field of Search ............................ 280/642, 644, 280/647, 47.38, 47.4, 291; D12/129

(56) References Cited

U.S. PATENT DOCUMENTS

| 4,026,568 A | * | 5/1977 | Hallam ........................ 280/42 |
| 4,767,130 A | * | 8/1988 | Fu-Chao ..................... 280/202 |
| 5,299,825 A | * | 4/1994 | Smith ......................... 280/644 |
| 5,301,963 A | | 4/1994 | Chen |
| 5,660,435 A | * | 8/1997 | Eichhorn ............... 297/219.12 |
| 5,669,624 A | * | 9/1997 | Eichhorn ................... 280/642 |
| 5,765,856 A | * | 6/1998 | Kiser ........................ 280/642 |
| 5,772,235 A | * | 6/1998 | Espenshade ............... 280/643 |
| 6,102,431 A | | 8/2000 | Sutherland et al. |
| 6,315,309 B1 | * | 11/2001 | Li et al. ................... 280/47.38 |
| 6,318,750 B1 | * | 11/2001 | Lan ............................ 280/642 |
| 6,402,166 B1 | * | 6/2002 | Chiu ....................... 280/47.38 |
| 6,722,689 B2 | * | 4/2004 | Kreamer ..................... 280/642 |
| 6,739,616 B2 | * | 5/2004 | Lin ............................ 280/642 |

* cited by examiner

*Primary Examiner*—Christopher P. Ellis
*Assistant Examiner*—Christopher Bottorff
(74) *Attorney, Agent, or Firm*—Merchant & Gould P.C.

(57) ABSTRACT

This pushchair for babies comprises two back wheels and a central front wheel being a castoring wheel, and is characterized in that a footrest is linked in a pin-jointed connection to the lower portion of the converging front legs, the castoring wheel being fitted to the front end of said footrest, this latter being provided with a device being apt to lock it in its position when in use and allowing to fold it. This footrest does also comprise a device allowing to lock and unlock the castoring support supporting the castoring wheel, this latter being provided with braking mechanism.

2 Claims, 2 Drawing Sheets

FOLDABLE PUSHCHAIR FOR BABIES

FIELD OF THE INVENTION

This invention relates to a foldable pushchair for babies.

BACKGROUND OF THE INVENTION

Some models of foldable pushchairs for babies have been already known for years which comprise only three wheels, i.e. two back ones and a central front one being in some cases a castoring wheel.

SUMMARY OF THE INVENTION

It is the object of this invention to improve the construction of this type of pushchairs for babies as regards their forward lower portion to which the castoring wheel is fitted.

These improvements consist in the provision in the above-mentioned region of the pushchair of a pin-jointed footrest in its turn providing the support for the front wheel, said footrest being apt to adopt an active position and a folded position allowing to obtain a compactly folded arrangement of the pushchair.

Also characteristic of this pushchair is the presence of means allowing to lock and unlock the castoring support of the front wheel, and the arrangement of a cable-actuated braking device allowing to brake said wheel.

The active position of the footrest is locked through means being incorporated in it and gripping a plate being fixed to the lower portion of the front legs.

These and other characteristics will be best made apparent by the following detailed description whose understanding will be made easier by the accompanying two sheets of drawings showing a practical embodiment cited only by way of example not limiting the scope of the present invention.

DETAILED DESCRIPTION OF THE PREFERRED EMBODIMENT

According to the drawings the pushchair for babies comprises a front wheel (1) being provided with a pneumatic tire (2) and fitted to the lower portion of the converging front legs (3) and (4) by means of a footrest (5).

Figure 1:
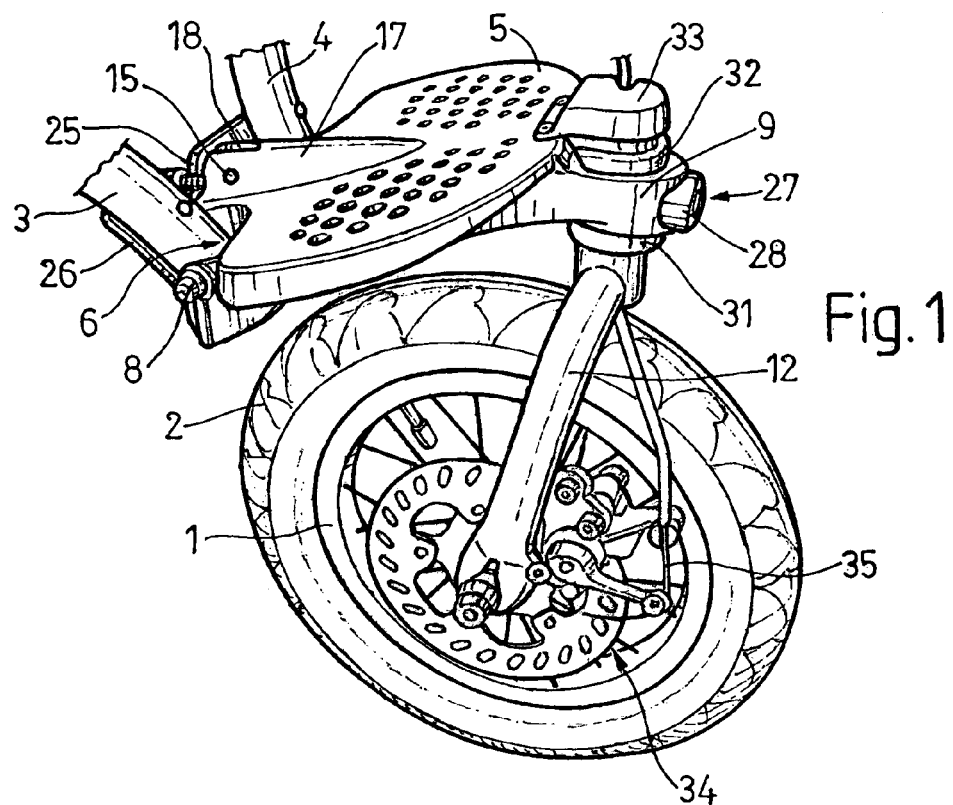
FIGS. 1 and 2 illustrate in a perspective view the forward lower portion of the pushchair with the footrest in its position when in use and in its folded position, respectively.
Figure 2:
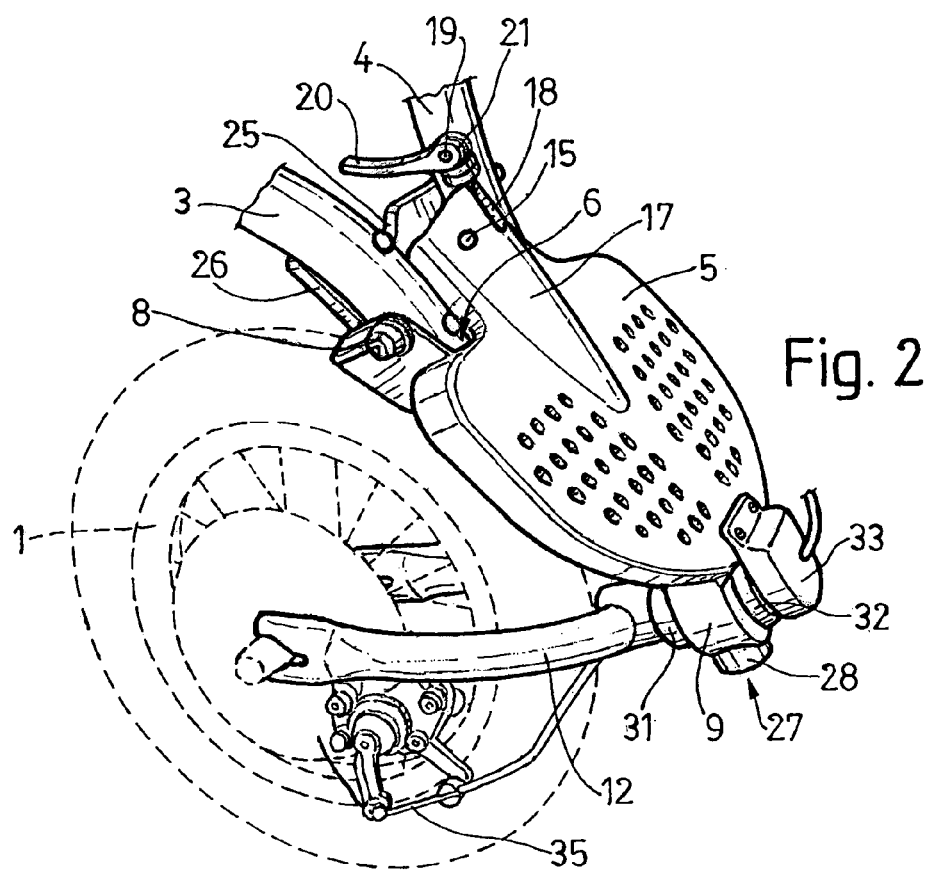
Figure 3:
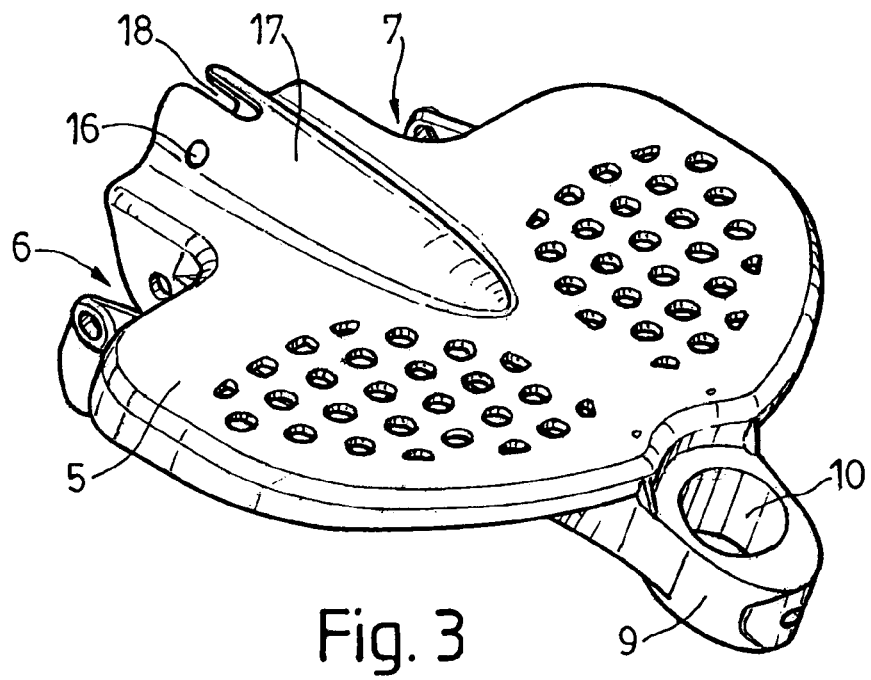
FIG. 3 represents in a perspective view the construction of the footrest.

This footrest (5) is formed by a metallic one-piece member in its rearward portion forming two recesses (6) and (7), the lower ends of the front legs (3) and (4) being fitted to said recesses by means of a cross-pin (8) thus providing a pin-jointed connection for said footrest. The footrest (5) at its forward portion has an extension (9) being vertically bored thus forming the cylindrical passage (10) (FIG. 3) allowing to fit the supporting pin (11) carrying the fork (12) to which the wheel (1) is fitted.

The footrest (5) comprises means being apt to lock it in its position when in use, said means consisting in a tightening device being formed by a bolt (13) whose head (14) is pin-jointed on a cross-pin (15) (FIG. 4) extending through holes (16) being provided in a rearward longitudinal protuberance (17) of the footrest (5), said protuberance having an end notch (18). A cylindrical nut (19) is fitted to said bolt and serves as the pin of a control handle (20) with cam (21), a spring (22) and washers (23) and (24) (FIG. 4) being fitted around said bolt.

In the locked position of the footrest (5) the bolt, (13) fits into an upper notch (25) being provided in a plate (26) being fixed to the rearward portion of the ends of the legs (3) and (4).

Figure 4:
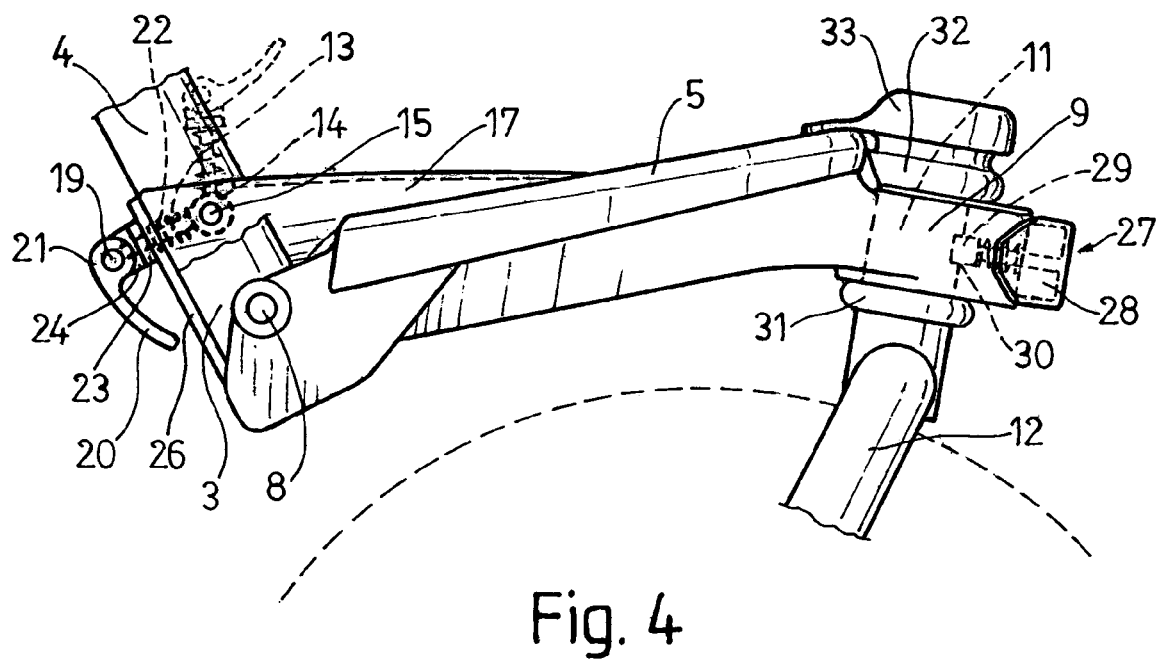
FIG. 4 shows in a side elevation the footrest with the locking means allowing to lock its pin-jointed connection and with the locking means allowing to lock the castoring wheel support.

The castoring of the supporting pin (11) can be locked by means of a lock (27) having two axial positions and being provided with an outer control knob (28) and an inner pin (29) which in the locked position fits into a hole (30) of said supporting pin (11) (FIG. 4).

This supporting pin (11) is fitted to the extension (9) of the footrest with the aid of bearings (31) and (32), said pin being secured by means of a nut being guarded by a cap (33).

The front wheel (1) is provided with disc-braking means (34) being actuated by means of a cable (35).

The invention can within its essentiality be put into practice in other embodiments differing only in detail from the one having been described above only by way of example, said other embodiments also falling within the scope of the protection being claimed.

What is claimed is:

1. A foldable pushchair for babies comprising:
    a central front wheel being a castoring wheel, and
    a footrest being formed by a plate, wherein said footrest is linked by a pin-jointed connection to a lower portion of converging front legs by a cross pin, said footrest comprising:
        a rearward portion of said footrest defining two recesses, the front legs being fitted to said recesses by the cross-pin,
        an extension provided with a cylindrical bore at a forward portion of said footrest to fit a fork to which the castoring wheel is fitted, and
        means for locking the footrest in a position when in use and allowing for folding said footrest, said means being gripped to a plate being fixed to the lower portion of the front legs.

2. A foldable pushchair for babies as per claim 1, wherein the footrest comprises means allowing to lock and unlock a castoring support supporting the castoring wheel, the wheel being provided with braking means.

* * * * *